United States Patent
Malomed et al.

(10) Patent No.: US 6,591,047 B2
(45) Date of Patent: Jul. 8, 2003

(54) METHOD AND APPARATUS FOR COMPENSATION OF NONLINEARITY IN FIBER OPTIC LINKS

(75) Inventors: Boris Malomed, Gan-Yavneh (IL); Uri Mahlab, Or Yehuda (IL)

(73) Assignee: ECI Telecom Ltd., Petach-Tikva (IL)

( * ) Notice: Subject to any disclaimer, the term of this patent is extended or adjusted under 35 U.S.C. 154(b) by 315 days.

(21) Appl. No.: 09/780,572

(22) Filed: Feb. 12, 2001

(65) Prior Publication Data

US 2002/0136514 A1 Sep. 26, 2002

(51) Int. Cl.[7] ................................................. G02B 6/00
(52) U.S. Cl. ...................................... 385/122; 385/123
(58) Field of Search ................................. 385/122–123

(56) References Cited

U.S. PATENT DOCUMENTS

| 5,166,942 A | * 11/1992 | Cardimona et al. ........... 372/21 |
| 5,172,258 A | 12/1992 | Verber |
| 5,278,930 A | 1/1994 | Chikuma et al. |
| 6,047,011 A | 4/2000 | Cook |
| 6,178,035 B1 | 1/2001 | Eda et al. |

FOREIGN PATENT DOCUMENTS

| JP | 2000-147579 | 5/2000 |
| WO | WO 00/49458 | 8/2000 |

OTHER PUBLICATIONS

Zhang et al., "Pulse Shaping of Ultrashort Laser Pulses with Nonlinear Optical Crystals", *Jpn. J. Appl. Phys.*, Nov. 1999, p. 6351–6358, vol. 38, Publication Board, Japanese Journal of Applied Physics.

Paré et al., "Split Compensation of Dispersion and Selp–Phase Modulation in Optical Communication Systems", *Optics Communications*, Feb. 1, 1999, p. 130–138, vol. 160, Elsevier Science B.V.

Takamoto, Sasaki, Higher Harmonic Laser Beam Generating Apparatus, Generated Document: Patent Abstracts of Japan, Application No.: 07007565, Application date: Sep. 8, 1996, Publictaion No.: 08201862A.

Bang, Ole, Balslev, Carl Balslev, Christiansen, Peter L., Engineering Competing Nonlinearities; Optics Letters; Oct. 15, 1999/vol. 24, No. 20.

Stegeman, G.I., Hagan, D.J., Torner, L. Optical And Quantum Electronics, Aug. 22, 1996.

Etrich, Christoph, Lederer, Falk, Malomed, Boris A., Peschel, Thomas, Peschel, ULF, Optical Solitions in Media With a Quadratic Nonlinearity, Institute of Solid State Theory and Theoretical Optics, Friedrich–Schiller–University Jena, Max–Wien–Platz1, D–07743 Jena, Germany; Department of Interdisciplinary Studies, Faculty of Engineering, Tel Aviv University, Tel Aviv 69978, Israel.

Patent Abstract, of CN1045282A entitled "GROWING LOW TEMPERATURE PHASE–DEVIATION BARIUM BORATE MONOCCRYSTAL BY SMELTING SALT CRYSTAL METH . . . " applicant: Fujian Material Construction Inst., Chinese Acadamey of Sciences, published Sept. 12, 1990.

Patent Abstract of SU 1365932 A1, entiitled "NON LINEAR OPTICAL WAVE GUIDE", applicant PEOPLE'S FRENDSHIP UNIVERSITY, published Aug. 10, 1999.

* cited by examiner

Primary Examiner—Akm E. Ullah
Assistant Examiner—Jerry T Rahll
(74) Attorney, Agent, or Firm—Browdy and Neimark, P.L.L.C.

(57) ABSTRACT

A method and a device for compensation of nonlinearity appearing in optical fiber links due to the positive Kerr effect created by optical fibers, the method comprises conveying an optical signal via one or more such compensating devices, each being capable of creating the negative Kerr effect for one or more optical wavelengths.

24 Claims, 1 Drawing Sheet

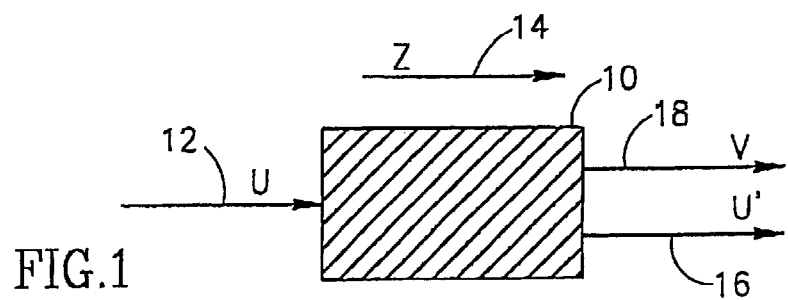
FIG.1
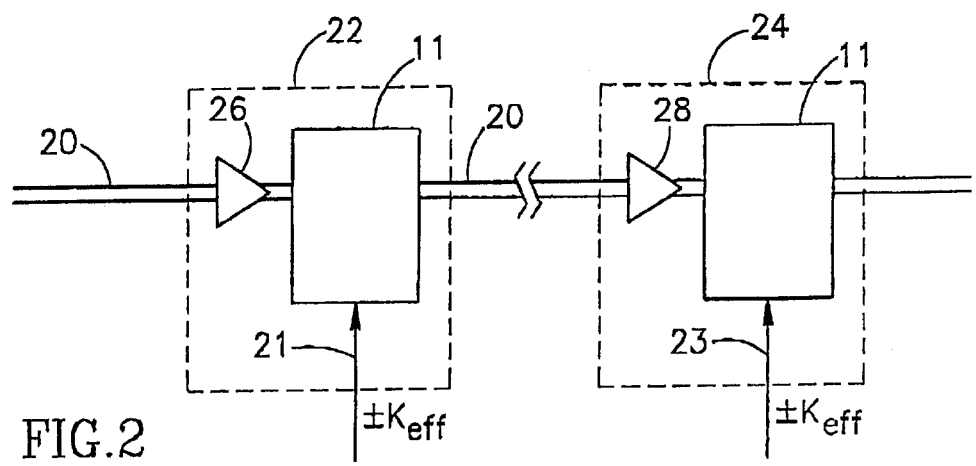
FIG.2
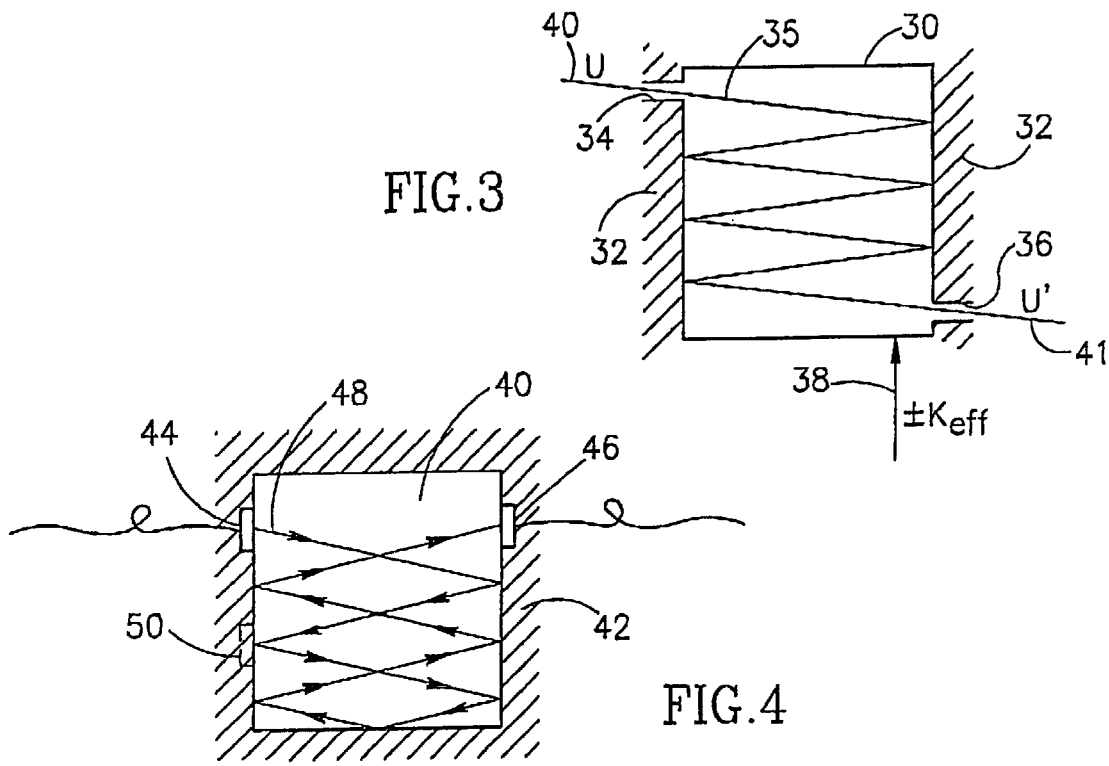
FIG.3
FIG.4

METHOD AND APPARATUS FOR COMPENSATION OF NONLINEARITY IN FIBER OPTIC LINKS

FIELD OF THE INVENTION

The present invention relates to a technology of nonlinearity compensation in optical communication networks.

BACKGROUND OF THE INVENTION

Three basic physical factors, that are known as limiting the achievable bit-rate in optical communication links, are chromatic dispersion, power losses and non-linearity effect.

Nonlinearity, that is a nonlinear phase shift accumulated by a light signal while being transmitted via an optic fiber, is generated by the Kerr effect in silica glass. Owing to that effect, the refraction coefficient of a material changes with the intensity of the optical signal, according to the following formula:

$$n = n_0 + K|E|^2, \qquad (1)$$

where K is the Kerr coefficient.

It is known to those skilled in the art, that power losses can be compensated by all-optical Erbium-doped or Raman amplifiers periodically installed into a long fiber link.

Dispersion can also be compensated by periodically inserting relatively short elements with the opposite sign and large absolute value of the dispersion, which makes it possible to have the average dispersion practically equal to zero. Among such elements is, for example, a fiber of a different kind, or very short pieces of a fiber with the Bragg grating written on it.

Unlike these linear effects, direct compensation of accumulated nonlinear phase shift seems physically impossible nowadays, since conventional optical materials are all self-focussing i.e., they have the Kerr effect of the positive sign only.

On the other hand, known in the art are the so-called nonlinear crystals capable of producing higher harmonics of an optical signal from its fundamental harmonic. Such crystals, for example potassium titanyl phosphate (KTP), potassium dihydrogen phosphate (KDP), barium borate optical crystals (BBO) and the like are used in various types of laser generators. Examples of such systems can be found in JP 08201862 A2, U.S. Pat. No. 6,047,011, and others.

OBJECT OF THE INVENTION

It is the objective of the invention to provide a method, a device and a system for compensating the nonlinearity in fiber optic links, such as communication links.

SUMMARY OF THE INVENTION

According to the first aspect of the invention, the above objective can be achieved by providing:

a method for compensating nonlinearity accumulating in an optical signal passing via an optical fiber link, the nonlinearity being created due to the positive Kerr effect of optical fibers forming the link, the method comprising:
  passing the optical signal at a particular wavelength via the fiber link,
  conveying said optical signal via one or more compensating devices capable of creating an artificial negative Kerr effect for the said particular wavelength.

In the method, each of said compensating devices is based upon at least one element selected from the following non-exhaustive list including: a second-harmonic-generating (SHG) optical crystal, a second-harmonic-generating (SHG) polymer fiber (for example, obtained by poling), and a semiconductor waveguide.

Preferably, the step of conveying the optical signal via said one or more compensating devices comprises conveying the optical signal along a multi-segment trajectory in at least one of the compensating devices, thereby arranging an extended optical path for said optical signal. For example, the optical path can be extended by forming a multi-path "zig-zag" trajectory of the incoming optical beam in the compensating device.

The method is most efficient for gradual compensation of the nonlinearity in the fiber optic link, wherein the step of conveying the optical signal comprises passing it via a chain of more than one said compensating devices spanned by sections of said optical fiber link. In other word, if more than one compensating devices are inserted in the link and spaced from one another, each of them will compensate nonlinearity accumulated in a preceding section of the fiber link.

For a case of multi-channel transmission, the method further includes steps of: passing via the said optical fiber link one or more additional optical signals with respective wavelengths different from one another and from said particular wavelength, and
  conveying said at least one additional optical signal via said one or more compensating devices,
  wherein said one or more compensating devices being capable of creating the negative Kerr effect with respect to the wavelengths of the one or more additional optical signals.

The above-described method can be used for WDM transmission format.

If compensation of the nonlinearity is nonuniform for different optical channels in the multi-channel transmission, optical channels with better compensation of nonlinearity can be used for transmitting information having higher priority.

According to a second aspect of the invention, there is proposed a suitable system for compensating nonlinearity appearing in an optical fiber link due to the positive Kerr effect, the system comprising
  one or more optical fibers forming a part of the link, and creating said positive Kerr effect,
  one or more compensating devices being inserted in said link and capable of creating the negative Kerr effect for at least one optical channel.

In accordance with the further aspect of the invention, there is also provided a compensating device for compensation of nonlinearity appearing in optical fiber links due to the positive Kerr effect created by optical fibers, said compensating device being capable of creating the negative Kerr effect for one or more optical wavelengths.

The proposed compensating device comprises at least one element from the following non-exhaustive list including a second-harmonic-generating optical crystal, a second-harmonic-generating polymer fiber (such as a poled polymeric fiber), and a semiconductor waveguide.

In the preferred embodiment of the invention, the compensating device comprises the second-harmonic-generating (SHG) optical crystal selected from a non-exhaustive list comprising KTP, KDP and BBO.

According to one specific implementation, the crystal has a cubic form and is covered at its two opposite facets by mirror surfaces (for internal reflection), leaving two windows at said opposite facets for an incoming optical beam and an outgoing optical beam respectively, intended for the fundamental harmonic of the beam to arrange between said two windows an extended optical path of the optical beam through the crystal.

Actually, the crystal may have other shapes, be covered by mirror surfaces not only at its opposite sides, and may have more than two optical ports for incoming and outgoing beams, thus enabling selection of any pair of such ports for a specific length of the trajectory.

Preferably, the length of the optical path in the crystal is selected so as to ensure the minimal output power of the second harmonic generated in the crystal.

The compensating device is preferably integrated with an optical amplifier and placed immediately after said amplifier.

In practice, the compensating device may form part of an optical network node.

According to yet another aspect of the invention, there is also provided a method for producing a compensating device for nonlinearity compensation in an optical fiber, the method comprising: obtaining a second-harmonic-generating (SHG) optical crystal and ensuring that the sign of the Kerr effect created by said crystal for at least one optical wavelength is negative.

Preferably, the above method comprises a step of controlling the sign and value of the Kerr effect to be created in the crystal by periodic poling of said SHG optical crystal.

Also, the method preferably includes selecting (by suitable calculation) of a length of the optical path in the crystal to ensure the minimum output power of the second harmonic generated in the crystal.

Further aspects and details of the invention will become apparent from the following description.

BRIEF DESCRIPTION OF THE DRAWINGS

The invention will further be described with reference to the attached non-limiting drawings, in which:

FIG. 1 (prior art) is a schematic illustration of a non-linear (SHG) crystal capable of producing a second harmonic from a fundamental harmonic of the applied optical signal.

FIG. 2 is a schematic illustration of the proposed method and system for compensation of non-linearity in optical fiber communication links.

FIG. 3 schematically illustrates one embodiment of the device according to the invention for compensating non-linearity in optical systems.

FIG. 4 schematically illustrates another embodiment of the device.

DETAILED DESCRIPTION OF THE INVENTION

The present invention is based on an idea to use, for the nonlinearity compensation, such optical media which have never been used for this purpose. Namely, the Inventors propose a method for compensation of a regular positive nonlinearity in an optical fiber link by introducing in said link one or more compensating devices capable of producing an artificial negative nonlinearity for an optical signal passing there-through.

The optical fiber link is most preferably a communication link serving for transmitting there-through one or more optical signals using respective one or more optical wavelengths.

Examples of the above-mentioned compensating devices can be found in the following non-exhaustive list comprising: a so-called nonlinear optical crystal, a poled polymer fiber, and a semiconductor wave guide. Preferably, compensation of the non-linearity is provided periodically, when the devices are inserted at a distance from one another, said distances being spanned by the optical fiber. However, the compensation can be non-periodic, i.e. the device(s) may of course be placed at a particular point of the link, and several (n) samples of the nonlinear crystal can be stuck together, thereby achieving the n-fold compensation effect.

The non-linear optical crystals (for example, the presently available KTP, KDP, BBO or the like) are such capable of receiving a light beam having a fundamental harmonic and producing there-inside at least one higher-order harmonic light beam. For the sake of simplicity and in the frame of the present description, these crystals will be called Second Harmonic Generation crystals, or SHG crystals.

It is known that polymer fibers, if subjected to uniform poling, acquire the property similar to that of the above-mentioned crystals, i.e., the capability of producing a second harmonic when conducting a fundamental harmonic light beam.

Both in the nonlinear crystals, and in the polymer fibers the property of SGH (second harmonic generation) is capable to induce the negative sign of the nonlinearity produced by the device.

The semiconductor waveguides at particular conditions (when the carrier frequency of the light signal is close to the half-band of the semiconductor material) also may produce the negative nonlinearity, though this effect is based on different physical principles.

To the best of the Inventors' knowledge, none of the above-referred to devices has ever been proposed for compensating nonlinearity in optical fiber links.

It is known to the specialists that the physical effect of producing a second harmonic in the non-linear (SHG) crystal can be described by a system of two differential equations:

$$\begin{cases} i\dfrac{dU}{dz} + U*V = 0 \\ 2i\dfrac{dV}{dz} + \dfrac{1}{2}U^2 - q*V = 0 \end{cases} \tag{2}$$

Where:
   U(z) is a fundamental (first) harmonic of the light signal,
   V(z) is a second harmonic of the light signal produced in the crystal,
   z—is the propagation distance for the light signal,
   q—is a so-called mismatch coefficient or phase velocity mismatch parameter, depending on the wavelength of the optical signal
   i—is the square root of (−1).

It is also known that the nonlinear phase shift Δϕ of the light beam at a fundamental harmonic emerging from the crystal is proportional to the following product:

$$\Delta\phi \approx K_{eff}|U|^2 \tag{3}$$

where $K_{eff}$ is the effective Kerr coefficient achieved in the crystal.

Further, it is known that a very large value of the effective Kerr coefficient ($K_{eff}$) can be generated via a so-called cascading mechanism in the second-harmonic-generating optical crystals [C. Etrich, F. Lederer, B. A. Malomed, Thomas Peschel, U. Peschel. Optical Solitons in Media with a Quadratic nonlinearity. E. Wolf. Progress in optics 41©2000 Elsevier Science B.V.].

The cascading mechanism is described, for example in [G. I. Stegeman, D. J. Hagan, and L. Torner, Optical and Quantum Electronics., vol. 28, p. 1691–1740 (1996)] incorporated herein by reference.

Namely, it has been noticed that the value of $K_{eff}$ in the non-linear (SHG) crystals is much more than the natural Kerr coefficient of the crystal, and is estimated as:

$$K_{eff} = \pm 10^{4} * K, \quad (4)$$

where K is the intrinsic Kerr coefficient.

The most important fact is that the gigantic Kerr coefficient $K_{eff}$ induced by the cascading mechanism may have either positive or negative sign. As can be seen from the system of equations (2), it can be readily controlled by means of the phase velocity mismatch parameter q. There are some scientific articles which theoretically investigate such a phenomenon [O. Bang, C. B. Clausen, P. I. Christiansen, Lluis Torner Engineering competing nonlinearities. Optics Letters, Oct. 15, 1999, Vol.24, No.20].

In turn, the mismatch parameter can be conveniently controlled by means of a so-called quasi-phase matching technique, i.e., by a periodic inversion of orientation of domains inside the second-harmonic-generating optical crystal a periodic poling.

It has been realized by the Inventors, that the sign of the cascading-induced effective Kerr coefficient $K_{eff}$ may be made negative to produce the negative formal Kerr effect, and be used for compensating the ordinary positive Kerr effect accumulated in long fiber spans.

The above-mentioned estimate that the effective Kerr coefficient $K_{eff}$ induced by the cascading may exceed the intrinsic Kerr coefficient K by four orders of magnitude implies that, for a 50 km long fiber span, the necessary compensating optical path in the second-harmonic-generating crystal must be approximately 5 m. Nowadays, it seems not realistic, as the actual size of the presently available crystal samples (those of the cubic form) is limited by 5 cm. However, other samples may appear in practice in some time, if the proposed technology for the nonlinearity compensation is accepted by the industry.

On the other hand, the nonlinearity compensating devices of various sizes and efficiencies may be developed also on the basis of the polymer fibers and semiconductor waveguides.

Taking into account the presently available actual size of the crystals having the cubic form, and by covering two opposite facets of the cubic sample by mirror surfaces, it is possible to arrange a so-called multi-path transmission of the optical beam through the crystal. According to the above estimate, the actual number of the paths must approximately be 100, implying the separation space of 0.5 mm between adjacent trajectories, which is very easy to implement.

To make this nonlinearity compensator most efficient and economical, it should be integrated with amplifiers periodically placed in the fiber communication line. Preferably, the second-harmonic-generating crystal must be placed immediately after the amplifier, to maximize the nonlinear effect provided by the nonlinearity compensator.

An approximate straightforward calculation taking into account gradual attenuation of an optical signal in a free propagation fiber span demonstrates that if the compensator is placed immediately after an amplifier, the necessary length of the compensating optical path can be additionally reduced by a factor of about 2.5. This result eventually implies that the incidence angle of the beam shuttling inside the mirror-covered second harmonic generating crystal having sizes 5 cm×5 cm, should be of about 1.5 degrees, which is easy to implement.

For a multi-channel transmission, such as in WDM systems, one nonlinear crystal can be used for non-linear compensation of a number of WDM channels. Many optical channels having different wavelengths will propagate in the non-linearity compensating device via one and the same trajectory. However, the mismatch coefficient q will be different for the different wavelengths. Thus, the Kerr effect and, consequently, the degree of the nonlinearity compensation in different channels will depend on the respective values of the mismatch coefficient q. However, if channels with incomplete compensation of the nonlinearity are known in advance, they can be used for transmitting less responsible information.

Actually, the compensator as above can form a self-containing unit insertable to a suitable point in an optical link. For example, it can be placed at a network node which, in addition to its functional equipment, usually comprises amplifiers and devices for compensating other non-desired effects. Alternatively, the compensator may form an integral part of the network node. The network node may be intended for any known function such as filtering, multiplexing, demultiplexing, switching etc.

The drawings that are referred to below illustrate the most preferred embodiment of the invention according to which the compensating device comprises a so-called nonlinear optical crystal also called second harmonic generating (SHG) optical crystal.

In FIG. 1, the optical non-linear crystal is marked 10, the incoming optical signal having the fundamental harmonic U is marked 12, the optical axis "z" of the crystal is marked 14. The crystal produces an output fundamental harmonic U' signal (16) and also an output second harmonic signal V (18) which is usually utilized in producing laser generators.

The invention puts an emphasis on obtaining from the crystal the fundamental harmonic signal U' which, due to the cascading effect, is always characterized by a particular sign of the cascading-induced effective Kerr coefficient.

The invention deals with the output fundamental harmonic signal U', while known laser devices utilize the output second harmonic and other higher-order harmonics. Preferably, to obtain the output fundamental harmonic signal free from the noise produced by the output second harmonic, length "z" of the optical path in the crystal can be calculated using the system of equations (2). It is known that the second-harmonic output periodically increases and fades depending on the length of the optical path in the crystal. Therefore, the crystal can be manufactured with such a length of the optical axis, which ensures the minimal second harmonic output.

FIG. 2 shows that one or more nonlinear crystals 11 can be introduced in an optical fiber link 20 to compensate the ordinary positive Kerr effect accumulated in long fiber spans. Knowing that the cascading-induced effective Kerr coefficient ($K_{eff}$) in the relatively small crystal 11 may be very high, and knowing how to adjust the sign of the effective Kerr coefficient in the crystal, the problem can be solved. The procedure of checking the sign of the Kerr effect of the crystal is performed in advance, when manufacturing the crystal. If the sign of the effective Kerr coefficient does not suit the purpose (which is usually the case), it is controlled by affecting the q-coefficient by periodical poling of the crystal domains. Eventually, the value of the effective Kerr coefficient can be adjusted by the mentioned procedure. After ensuring that the effective Kerr coefficient corresponds to a negative formal Kerr effect, (arrows 21, 23 signify the operation provided in advance), there is only a technical question of further adjusting the value of the negative Kerr coefficient to the required length of the optic fiber span. It can be done, for example, by selecting distances between the nonlinearity-compensating devices 11 placed along the fiber span. Another option is extending the effective optical path of the light beam inside the device, for example by arranging a multi-path transmission that is shown in FIG. 3. The nonlinear crystals 11 may physically form part of network nodes marked 22 and 24. Preferably, the crystals are placed immediately after optical signal amplifiers 26, 28 of the nodes.

FIG. 3 schematically shows a cross-section of one embodiment 30 of the optical crystal adapted for compensating nonlinear effects in a fiber. The optical crystal 30 is a KTP or BBO nonlinear crystal of a cubic form, which is coated by a reflecting surface 32 at two of its opposite facets. As known in the art per se, there are also other ways of achieving such reflecting surfaces and the products of such methods are encompassed in the present invention. In FIG. 3 the crystal is provided with one input opening 34 in the reflecting surface, via which the incoming optical signal, with the accumulated positive Kerr effect and having the fundamental harmonic U, enters the crystal. The crystal is preliminarily controlled (schematically shown as arrow 38) to adjust the sign and value of the effective Kerr coefficient produced by it. In the crystal, owing to the reflecting surfaces, the light beam is forced to perform a multi-path trajectory 35 for extending the optical path and comes out via an output window 36 as a modified signal U'. In the signal U', the earlier accumulated positive Kerr effect is compensated with the negative Kerr effect created by the crystal. As has been explained before, the trajectory can be made sufficiently long to provide for the value of the effective Kerr coefficient required for compensating the accumulated positive Kerr effect. The accumulated compensating phase shift is directly proportional to the length of the total optical path via the crystal. The total trajectory length, in turn, can be regulated by the incidence angle of the beam 40.

For calculation of the extended optical path, the system of equations (2) can be used and boundary conditions of reflection should be considered for taking into regard the phase shift appearing at the points of the beam reflection from the mirror surfaces. The crystal 30 can be placed in a container, and the windows 34 and 36 can be provided with collimating lenses for focussing and adjusting the light beam.

FIG. 4 shows another modification 40 of the proposed device, where the non-linear optical crystal (shown in a cross section) is completely coated by a reflecting surface 42. Openings 44 and 46 in the mirror surface are provided with adjustable collimating lenses (schematically shown as boxes). Owing to the additional reflecting surface at the bottom facet of the crystal, the optical path of beam 48 in the crystal can be twice as long in comparison with that shown in FIG. 3 (if the crystals are similar). Moreover, one or more optional windows 50 can be provided on the surfaces of the crystal. The trajectory length can be thus regulated by selecting a particular incidence angle and a particular pair of the windows between which the beam should be passed. Such a device may serve as a variable nonlinearity compensator.

FIGS. 2 to 4 may successfully illustrate compensation of nonlinearity in multi-channel optical transmission, too. In such a case (for example, in a WDM transmission system) the incoming light beam arriving from an optical fiber comprises a number of fundamental harmonics with respective wavelengths $\lambda 1, \lambda 2, \ldots \lambda n$ (n optical channels). Having the same incident angle, the fundamental harmonics propagate in the crystal along a common trajectory. It should be taken into account that value of the negative Kerr effect produced in the crystal depends on the wavelength, so the non-linearity compensation provided by the crystal will be different for different optical channels.

It should be appreciated that the above description of specific implementations of the invention are not limiting and other embodiments of the invention may be proposed within the scope of the concept and are to be considered part of the invention.

What is claimed is:

1. A method for compensating nonlinearity accumulating in an optical signal passing via an optical fiber link, the nonlinearity being created due to the positive Kerr effect of one or more optic fibers forming the link, the method comprising: passing the optical signal at a particular wavelength via the optical fiber link, conveying said optical signal via one or more compensating devices capable of creating the negative Kerr effect for said particular wavelength.

2. The method according to claim 1, wherein said optical fiber link is a communication link.

3. The method according to claim 1, wherein each of said compensating devices comprises at least one element selected from the following non-exhaustive list including: a second harmonic generating (SHG) optical crystal, a second harmonic generating (SHG) polymer fiber, and a semiconductor waveguide.

4. The method according to claim 3, wherein the step of conveying the optical signal via said one or more compensating devices comprises conveying said optical signal along a multi-segment trajectory in at least one of said compensating devices.

5. The method according to any one of the preceding claims, for gradual compensation of the non-linearity in the optical fiber link, wherein the step of conveying the optical signal comprises passing it via a chain of more than one said compensating devices spanned by sections of said optical fiber link.

6. The method according to any one of the preceding claims, for compensating nonlinearity in the optical fiber link performing a multi-channel transmission, the method further comprising steps of:

passing via said optical fiber link one or more additional optical signals with respective wavelengths different from one another and from said particular wavelength, and conveying said at least one additional optical signal via said one or more compensating devices, wherein said one or more compensating devices being capable of creating the negative Kerr effect with respect to the wavelengths of the one or more additional optical signals.

7. The method according to claim 6, wherein said multi-channel transmission is WDM transmission.

8. The method according to claim 6 or 7, further comprising using optical channels with better compensation of non-linearity for transmitting higher priority information.

9. A compensating device for compensation of nonlinearity appearing in optical fiber links due to the positive Kerr effect created by optical fibers, said compensating device being capable of creating the negative Kerr effect for one or more optical wavelengths.

10. The compensating device according to claim 9, comprising at least one element from the following non-exhaustive list including a second harmonic generating optical crystal, a second harmonic generating polymer fiber and a semiconductor wave guide.

11. The compensating device according to claim 10, provided with a reflecting surface adapted to create internal reflections in the compensating device, and having at least one optical port for an incoming optical beam and at least one optical port for an outgoing optical beam, the arrangement being suitable for obtaining an extended optical path of an optical beam if traveling between a couple of said ports through the compensating device.

12. The compensating device according to claim 11, wherein a length of the optical path in the compensating device is selected so as to ensure the minimal output power of the second harmonic generated in the compensating device.

13. The compensating device according to claim 11, wherein said compensating device has a cubic form and is coated at its two opposite facets with a reflecting surface, leaving openings for said at least two optical ports at said facets for an incoming optical beam and an outgoing optical beam.

14. The compensating device according to claim 10, comprising said second-harmonic generating (SHG) optical crystal selected from a non-exhaustive list comprising KTP, KDP and BBO.

15. The compensating device according to claim 9, integrated with an optical amplifier and placed immediately after said amplifier.

16. An optical network node comprising the compensating device according to claim 9.

17. A method for producing a compensating device for nonlinearity compensation in an optic fiber, the method comprising:

obtaining a second harmonic generating (SHG) optical crystal and ensuring that the sign of the Kerr effect created by said crystal to at least one optical wavelength is negative.

18. The method according to claim 17, comprising controlling the sign and value of the Kerr effect to be created in said crystal by periodical poling of said SHG optical crystal.

19. The method according to claim 18, comprising selecting a length of the optical path in the crystal to ensure the minimal output power of the second harmonic generated in the crystal.

20. A system for compensating nonlinearity appearing in an optical fiber link due to the positive Kerr effect, the system comprising:

one or more optical fibers forming the link, and creating said positive Kerr effect, one or more compensating devices being inserted in said link and capable of creating the negative Kerr effect for at least one optical channel.

21. The system according to claim 20, comprising more than one said compensating devices inserted at different sections of said optical fiber link, thereby ensuring gradual compensation of the non-linearity accumulating in the sections of said link.

22. The system according to claim 20, wherein said optical fiber link is a communication link.

23. The system according to claim 20, wherein said optical fiber link is capable of performing optical multichannel transmission and said one or more compensating devices are capable of creating negative Kerr effect for each of the optical channels.

24. The system according to claim 23, wherein said multi-channel transmission is WDM transmission.

* * * * *